United States Patent [19]
Walsh

[11] Patent Number: 5,589,530
[45] Date of Patent: Dec. 31, 1996

[54] STABILIZATION OF LOW MOLECULAR WEIGHT POLYBUTYLENE TEREPHTHALATE/POLYESTER BLENDS WITH PHOSPHORUS COMPOUNDS

[75] Inventor: Eileen B. Walsh, Evansville, Ind.

[73] Assignee: General Electric Company, Pittsfield, Mass.

[21] Appl. No.: 308,722

[22] Filed: Sep. 19, 1994

Related U.S. Application Data

[62] Division of Ser. No. 164,642, Dec. 8, 1993, Pat. No. 5,367,011, which is a continuation of Ser. No. 994,738, Dec. 22, 1992, abandoned.

[51] Int. Cl.$^6$ .............................. C08K 5/53; C08K 5/524; C08K 5/521; C08K 3/32
[52] U.S. Cl. ......................... 524/152; 524/147; 524/151; 524/414; 524/417
[58] Field of Search ................................... 524/147, 151, 524/152, 414, 417

[56] References Cited

U.S. PATENT DOCUMENTS

| | | |
|---|---|---|
| Re. 31,992 | 10/1985 | Ancker et al. . |
| 2,465,319 | 3/1949 | Whinfield et al. . |
| 2,901,466 | 8/1959 | Kibler et al. . |
| 2,938,015 | 5/1960 | Gormley .................... 528/286 |
| 3,023,192 | 2/1962 | Shivers et al. . |
| 3,047,539 | 7/1962 | Pengilly . |
| 3,404,121 | 10/1968 | Barkey ...................... 524/147 |
| 3,462,389 | 8/1969 | Schulde et al. . |
| 3,497,477 | 2/1970 | Barkey et al. ............ 524/147 |
| 3,651,014 | 3/1972 | Witsiepe . |
| 3,763,109 | 10/1973 | Witsiepe . |
| 3,764,576 | 10/1973 | Russo . |
| 3,766,146 | 10/1973 | Witsiepe . |
| 3,784,520 | 1/1974 | Hoeschele . |
| 3,801,547 | 4/1974 | Hoeschele . |
| 3,919,383 | 11/1975 | Yankowsky ............... 524/414 |
| 3,935,081 | 1/1976 | Shotton . |
| 3,953,394 | 4/1976 | Fox et al. . |
| 3,971,753 | 7/1976 | Anderson . |
| 3,971,763 | 7/1976 | Frechtling et al. . |
| 3,986,997 | 10/1976 | Clark . |
| 4,043,971 | 8/1977 | Wurmb et al. . |
| 4,156,774 | 5/1979 | Buxbaum et al. . |
| 4,197,335 | 4/1980 | Goossens . |
| 4,264,761 | 4/1981 | McGirk . |
| 4,278,804 | 7/1981 | Ashby et al. . |
| 4,284,550 | 8/1981 | Mizuno et al. . |
| 4,293,479 | 10/1981 | Hanada et al. . |
| 4,348,462 | 9/1982 | Chung . |
| 4,351,758 | 9/1982 | Lu et al. . |
| 4,353,817 | 10/1982 | Nakae et al. . |
| 4,355,155 | 10/1982 | Nelson . |
| 4,357,271 | 11/1982 | Rosenquist . |
| 4,369,280 | 1/1983 | Dieck et al. . |
| 4,379,190 | 4/1983 | Schenck . |
| 4,444,931 | 4/1984 | Lu et al. . |
| 4,483,958 | 11/1984 | Kosaka et al. . |
| 4,491,508 | 1/1985 | Olson et al. . |
| 4,510,196 | 4/1985 | Carter, Jr. . |
| 4,536,531 | 8/1985 | Ogawa et al. ............ 524/417 |
| 4,548,979 | 10/1985 | Weise et al. . |
| 4,556,688 | 12/1985 | McCready et al. . |
| 4,556,705 | 12/1985 | McCready . |
| 4,598,117 | 7/1986 | Liu et al. . |
| 4,624,870 | 11/1986 | Anthony . |

(List continued on next page.)

FOREIGN PATENT DOCUMENTS

| | | |
|---|---|---|
| 0019926 | 12/1980 | European Pat. Off. . |
| 230252A3 | 11/1985 | Germany . |
| 60-231763 | 11/1985 | Japan . |
| 63-248850 | 10/1988 | Japan . |
| 1060401 | 3/1967 | United Kingdom . |

Primary Examiner—Veronica P. Hoke

[57] ABSTRACT

Blends of low molecular weight PBT resin and high molecular weight polyester resin, such as high molecular weight PBT resin, are imparted with excellent melt viscosity stability by the addition of certain phosphorus-containing compounds.

22 Claims, 1 Drawing Sheet

U.S. PATENT DOCUMENTS

| | | |
|---|---|---|
| 4,626,566 | 12/1986 | Miller et al. . |
| 4,639,486 | 1/1987 | Liu . |
| 4,661,555 | 4/1987 | Koga et al. . |
| 4,664,983 | 5/1987 | Nakamura et al. . |
| 4,672,086 | 6/1987 | Seiler et al. . |
| 4,687,692 | 8/1987 | Hepp . |
| 4,714,657 | 12/1987 | Quinn et al. . |
| 4,722,959 | 2/1988 | Inoue et al. . |
| 4,732,928 | 3/1988 | Mizushiro et al. . |
| 4,732,939 | 3/1988 | Hoshi et al. . |
| 4,734,450 | 3/1988 | Kawai et al. . |
| 4,760,112 | 7/1988 | McCready et al. . |
| 4,780,402 | 10/1988 | Remmington . |
| 4,790,965 | 12/1988 | Thorsrud . |
| 4,891,397 | 1/1990 | Liu . |
| 4,891,399 | 1/1990 | Ohkawa et al. . |
| 4,916,170 | 4/1990 | Nambu et al. . |
| 4,988,740 | 1/1991 | Walter . |
| 5,026,758 | 6/1991 | Grigo et al. . |
| 5,039,727 | 8/1991 | Onishi et al. . |
| 5,045,580 | 9/1991 | Kitamura ................................ 524/147 |
| 5,132,353 | 7/1992 | Wallace . |

STABILIZATION OF LOW MOLECULAR WEIGHT POLYBUTYLENE TEREPHTHALATE/POLYESTER BLENDS WITH PHOSPHORUS COMPOUNDS

This is a divisional of application Ser. No. 08/164,642, filed Dec. 8, 1993, now U.S. Pat. No. 5,367,011 which is a continuation of Ser. No. 07/994,738, filed Dec. 22, 1992, now abandoned.

BACKGROUND OF THE PRESENT INVENTION

Polyester resins derived from terephthalic acid and reactive derivatives thereof, such as dimethylene terephthalate, and alkane diols, e.g., of from 1 to 10 carbon atoms, e.g., ethylene glycol, and 1,4-butanediol, as well as related diols, such as 1,4-cyclohexane dimethanol, and mixtures of such resins have been known for some time and have become important constituents in injection moldable compositions. Workpieces molded from such polyester compositions, alone, or combined with reinforcments, offer a high degree of surface hardness and abrasion resistance, high gloss, and lower surface friction.

Accordingly, polyesters have found significant commercial applications. Polyesters are effectively used as an engineering plastic for electrical components, machines, cars, sporting goods, interior decorative goods and the like. For many of these applications it is desirable to employ a polyester resin having a relatively high molecular weight, i.e., having a melt viscosity of above about 600 poise as measured using a Tinium Olsen melt indexer at 250° C., 0.042 inch orifice (ASTM method D-1238); or having an intrinsic viscosity of above about 0.6 decaliters/gram as measured using a 120–130 mg sample of polyester in a 3:2 mixture of phenol/tetrachloroethane and measuring the time of flow with a Ubbelohde capillary viscometer at 25° C.

However, a problem which many plastics operators have exprienced with high molecular weight polyesters is the difficulty in processing the resins. In response thereto, a relatively low molecular weight PBT, less than about 600 poise, as measured using a Tinius Olsen melt indexer at 250° C., 0.042 inch orifice (ASTM method D-1238) has been added to the high molecular weight polyester to provide improved flow blends which still retain the excellent properties of the high molecular weight polyester. However, it has been found that while the blends of high molecular weight polyester and low molecular weight PBT initially exhibit a decrease in melt viscosity, the melt viscosity builds over time. See FIG. 1. Such a build up of viscosity of the blends limits the use of low molecular weight PBT in commercial applications. It would therefore represent a notable advance in the state of the art if a more stable high flow blend of a high molecular weight polyester and low molecular weight PBT could be found.

Jacquiss et al., U.S. Pat. No. 4,532,290, teach stabilizing polycarbonate-polyester compositions against undesirable changes in melting point by adding monosodium phosphate and/or monopotassium phosphate to the compositions. Hepp, U.S. Pat. No. 4,687,802, discloses that the arc track rate of PBT resins can be improved by the addition of a metal salt to the PBT resin.

However, none of the prior art teachings suggests a method of preparing a stable high flow blend of a high molecular weight polyester and a low molecular weight PBT. Surprisingly, the present inventor has now found that if certain phosphorus-containing compounds are added to the blends of high molecular weight polyester and low molecular weight PBT, there is achieved a high flow blend having excellent melt stability.

SUMMARY OF THE PRESENT INVENTION

Figure 1:
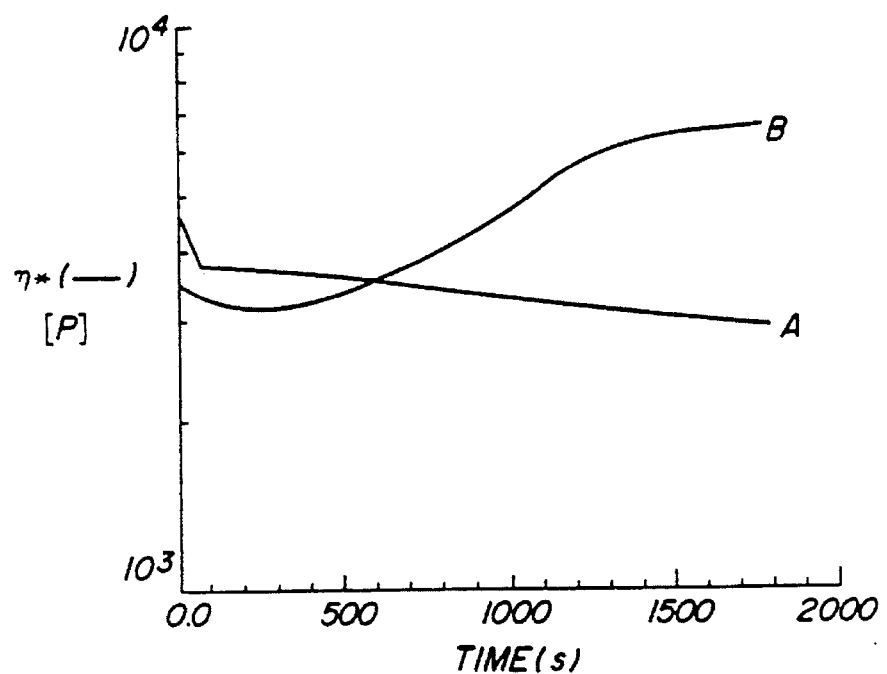
FIG. 1 depicts in graphic form a comparison of a time sweep of the melt viscosity of an unstabilized blend of a high molecular weight PBT (1100 poise) resin and a low molecular weight (300 poise) PBT resin (Line A) against a time sweep of a high molecular weight PBT resin (Line B).

According to the present invention there is disclosed a thermoplastic resin blend comprising: (a) a relatively low molecular weight polybutylene terephthalate resin; (b) a relatively high molecular weight polyester resin; and (c) an effective melt viscosity stabilizing amount of (i) an acidic phosphate salt, (ii) an acid, alkyl, aryl or mixed phosphite having at least one hydrogen or alkyl group, (iii) a Group IB or IIB metal phosphate salt (iv) a phosphorous oxo acid or (v) a mixture of any of the foregoing.

Also according to the present invention there is provided a process for stabilizing the melt viscosity of a thermoplastic resin blend comprising a relatively low molecular weight PBT resin and a relatively high molecular weight polyester resin comprising adding to the blend an effective amount of a (i) an acidic phosphate salt, (ii) an acid, alkyl, aryl or mixed phosphite having at least one hydrogen or alkyl group, (iii) a Group IB or IIB metal phosphate salt (iv) a phosphorous oxo acid or (v) a mixture of any of the foregoing.

DETAILED DESCRIPTION OF THE PRESENT INVENTION

The low molecular weight polybutylene terephthalate (PBT) useful in the practice of the present invention is a PBT resin having a melt viscosity of less than 600 poise, more preferably less than about 450 poise, and most preferably less than about 300 poise.

The high molecular weight polyester resins useful in the practice of the present invention are polyester resins having a melt viscosity above about 600 poise, more preferably above about 900 poise, and most preferably above about 1100 poise. Preferred as the high molecular weight polyester resins are high molecular weight polybutylene terephthalate, polyethylene terephthalate and polycyclohexane dimethylene terephthalate.

The low molecular weight polybutylene terephthalate resin employed in the present invention is typically one obtained by polymerizing a glycol component at least 70 mol %, preferably at least 80 mol %, of which comprises a tetramethylene glycol; and an acid component at least 70 mol %, preferably at least 80 mol %, of which comprises terephthalic acid, and polyester-forming derivatives thereof. Particularly useful is poly(1,4-butylene terephthalate).

Preferably, the glycol does not contain more than 30 mol %, more preferably not more than 20 mol %, of another glycol, such as ethylene glycol, trimethylene glycol, 2-methyl-1,3-propane glycol, hexamethylene glycol, decamethylene glycol, cyclohexane dimethanol, or neopentylene glycol. Examples of other copolycondensable polyols include 1,3-propylene glycol, pentaerythritol, 1,6-hexanediol, polyethylene glycol and polytetramethylene glycol.

Preferably the acid component contains not more than 30 mol %, more preferably not more than 20 mol %, of another acid such as isophthalic acid, 2,6-naphthalenedicarboxylic acid, 2,7-naphthalenedicarboxylic acid, 1,5-naphthalenedicarboxylic acid, 4,4'-diphenyldicarboxylic acid, 4,4'-diphenoxyethanedicarboxylic acid, p-hydroxy benzoic acid, sebacic acid, adipic acid and polyester-forming derivatives thereof. Examples of other copolycondensable polycarboxylic acids include azelaic acid, dodecane dicarboxylic acid, trimellitic acid, trimesic acid and hexahydroterephthalic acid.

The low molecular weight PBT resins can be prepared according to methods known to those of ordinary skill in the art, or they may be obtained commercially. Low molecular weight PBT is VALOX® 195 having a melt viscosity of about 300 poise from General Electric Company.

The high molecular weight polyester resins are those which are prepared in similar manner to the low molecular weight PBT, i.e., by polymerizing a glycol component and an acid component. Typically they are derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeating units of the following general formula:

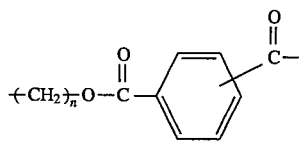

wherein n is an integer of from 2 to 6. The most preferred polyesters are poly(ethylene terephthalate), poly (1,4-butylene terephthalate) and mixtures thereof.

Also contemplated for use herein as the high molecular weight polyesters, are the above polyesters with minor amounts, e.g., from 0.5 to about 5 percent by weight, of units derived from aliphatic acids and/or aliphatic polyols to form copolyesters. The aliphatic polyols include glycols, such as poly(ethylene glycol). All such polyesters can be made following the teachings of, for example, U.S. Pat. Nos. 2,465,319 and 3,047,539.

Also useful as the high molecular weight polyesters are those derived from a cycloaliphatic diol and an aromatic dicarboxylic acid and which are prepared, for example, by condensing either the cis- or trans- isomer (or mixtures thereof) of, for example, 1,4-cyclohexanedimethanol with an aromatic dicarboxylic acid so as to produce a polyester having recurring units of the following formula:

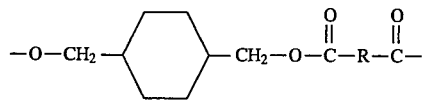

wherein the cyclohexane ring is selected from the cis- and trans- isomers thereof and R represents an aryl radical containing from 6 to about 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di-(p-carboxyphenyl)ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another useful high molecular weight polyester may be derived from the reaction of either the cis- or trans- isomer (or a mixture thereof) of 1,4-cyclohexanedimethanol with a mixture of isophthalic and terephthalic acids. Such a polyester would have repeating units of the formula:

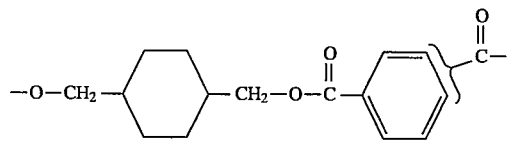

Still another useful high molecular weight polyester is a copolyester derived from a cyclohexanedimethanol, an alkylene glycol and an aromatic dicarboxylic acid. These copolyesters are prepared by condensing either the cis- or trans- isomer (or mixture thereof) of, for example, 1,4-cyclohexanedimethanol and an alkylene glycol with an aromatic dicarboxylic acid so as to produce a copolyester having units of the formulae:

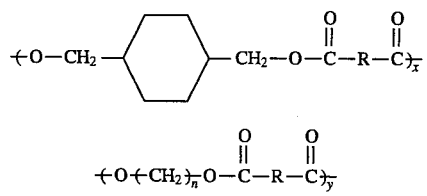

wherein the cyclohexane ring is selected from the cis- and trans- isomers thereof, R is as previously defined, n is an integer of 2 to 6, the x units comprise from about 10 to about 90 percent by weight and the y units comprise from about 90 to about 10 percent by weight.

Such copolyesters may be derived from the reaction of either the cis- or trans- isomer (or mixtures thereof) of 1,4-cyclohexanedimethanol and ethylene glycol with terephthalic acid in a molar ratio of 1:2:3. These copolyesters have repeating units of the following formulae:

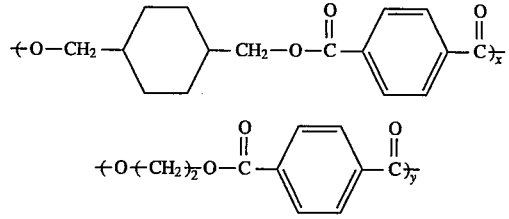

wherein x and y are as previously defined.

The high molecular weight polyesters described herein are either commercially available or can be produced by following methods well known in the art, such as those set forth in, for example, U.S. Pat. Nos. 2,901,466, 2,465,319 and 3,047,539.

Particularly suitable for practice of the present invention is high molecular weight PBT, which is sold commercially as VALOX® 295 (melt viscosity of about 1100 poise) or VALOX® 315 (melt viscosity of about 8500 poise), both available from General Electric Company.

The PBT blend can comprise the low molecular weight PBT resin in amounts ranging from about 5 to about 95, preferably from about 20 to about 80, more preferably from about 30 to about 70 and most preferably from about 40 to about 60 parts by weight based on 100 total parts by weight of the low molecular weight PBT and high molecular weight polyester resins taken together. Accordingly, the PBT blend comprises the high molecular weight polyester resin in amounts ranging from about 95 to about 5, preferably from about 90 to about 10, more preferably from about 70 to about 30 and most preferably from about 60 to about 40, parts by weight based on 100 total parts by weight of the low molecular weight PBT and high molecular weight polyester resins taken together.

The phosphorus-containing stabilizers of the present invention may comprise (i) acidic phosphate salts such as monozinc phosphates, sodium dihydrogen phosphate, potassium hydrogen phosphate, calcium hydrogen phosphate, sodium acid pyrophosphate and mixtures thereof. It has also been found that certain phosphite compounds (ii) may also be used in the practice of the present invention, e.g., those of the general formula $P\text{-}(OR')_3$ wherein each R' is the same or different and independently represents hydrogen, alkyl groups, aryl groups or any mixture thereof provided that at least one of the R' groups is hydrogen or alkyl. Illustratively, these include, but are not limited to, diphenylisodecyl phosphite, diisooctyl phosphite, dilauryl phosphite, diphenyl phosphite, phenyl diisodecyl phosphite, ethyl hexyl diphenyl phosphite, stearyl phosphite and mixtures thereof. The phosphorus-containing stabilizers may also comprise (iii) Group IB or Group IIB phosphate salts such as zinc phosphate or (iv) phosphorous oxo acids such as phosphorous acid, phosphoric acid, polyphosphoric acid, or hypophosphorous acid.

Preferred are phosphorus-containing compounds selected from zinc phosphate, diphenylisodecyl phosphite, monosodium phosphate and sodium acid pyrophosphate and mixtures thereof. Most preferred is zinc phosphate.

The phosphorus-containing compounds are generally employed in the compositions of the present invention in amounts ranging from about 0.1 to about 10, preferably from about 0.1 to about 5, more preferably from about 0.1 to about 2 and most preferably from about 0.2 to about 1, weight percent based on the weight of the total composition.

The compositions of the present invention may also comprise other thermoplastic resins which are conventionally added to polyester resins. These may include resins such as polycarbonates, polyestercarbonates, polyarylates and mixtures thereof.

In other embodiments of the present invention, the compositions can further comprise impact modifiers. Particularly useful impact modifiers generally comprise rubbery impact modifiers. These are well known to those skilled in the art, and any of them normally employed with polyester resins may be employed herein.

The preferred impact modifiers generally comprise an acrylic or methacrylic grafted polymer of a conjugated diene or an acrylate elastomer, alone, or copolymerized with a vinyl aromatic compound. Particularly useful are the core-shell polymers of the type available from Rohm & Haas, for example, those sold under the trade designation Acryloid®. In general these impact modifiers contain units derived from butadiene or isoprene, alone or in combination with a vinyl aromatic compound, or butyl acrylate, alone or in combination with a vinyl aromatic compound. The aforementioned impact modifiers are believed to be disclosed in Fromuth et al., U.S. Pat. Nos. 4,180,494; Owens, 3,808,180; Farnham et al., 4,096,202; and Cohen et al., 4,260,693. Most preferably, the impact modifier will comprise a two stage polymer having either a butadiene or butyl acrylate based rubbery core and a second stage polymerized from methylmethacrylate alone, or in combination with styrene. Also present in the first stage are crosslinking and/or graftlinking monomers. Examples of the crosslinking monomers include 1,3-butylene diacrylate, divinyl benzene and butylene dimethacrylate. Examples of graftlinking monomers are allyl acrylate, allyl methacrylate and diallyl maleate.

Additional preferred impact modifiers are of the type disclosed in U.S. Pat. No. 4,292,233. These impact modifiers comprise, generally, a relatively high content of a crosslinked butadiene polymer grafted base having grafted thereon acrylonitrile and styrene.

Other suitable impact modifiers include, but are not limited to ethylene vinyl acetate, ethylene ethylacrylate copolymers, SEBS (styrene ethylene-butylene styrene) and SBS (styrene-butadiene-styrene) block copolymers, EPDM (ethylene propylene diene monomer) and EPR (ethylene propylene rubber) copolymers, etc. All of these are well known to those skilled in the art and are available commercially.

The compositions of the present invention may further contain one or more reinforcing agents including glass fibers. Typical reinforcing agents useful in the practice of the present invention include, but are not limited to, glass fiber, talc, mica, clay or combinations thereof.

The filamentous glass which may be employed as a reinforcing agent in the present compositions is well known to those skilled in the art and is widely availiable from a number of manufacturers. For compositions to be employed for electrical uses, it is preferred to use fibrous glass filaments comprised of lime-aluminum borosilicate glass that is relatively soda-free. This is more commonly known as "E" glass. However, other glasses are useful where electrical propeties are not so important, e.g., the low soda glass known as "C" glass. The filaments are made by standard processes, e.g., by steam or air blowing, flame blowing and mechanical pulling. The filament diameters generally range from about 0.00012 to 0.00075 inches but this is not critical to the present invention.

Further, the glass fibers useful in the practice of the present invention may also be treated with functionalized silicon compounds to improve interaction with the polymer matrix, as is well known to those skilled in the art. Functionalized silanes, especially alkoxy silanes may be useful in this regard. Illustratively these include, but are not limited to, aminopropyl triethoxy silane, glycidyl propyl trimethoxy silane, (3,4-epoxy cyclohexyl) ethyl triethoxy silane, mercaptopropyl silane, aminoethyl aminopropyl alkoxy silane, ureido-alkyl trialkoxy silane and mixtures of any of the foregoing.

The length of the glass filaments and whether or not they are bundled into fibers and the fibers bundled in turn to yarns, ropes or rovings, or woven into mats and the like are also not critical to the present invention. However, in preparing molding compositions it is convenient to use the filamentous glass in the form of chopped strands of from about 0.0125 to about 2 inches long. In articles molded from the compositions on the other hand, even shorter lengths will be encountered due to fragmentation during compounding.

In general, the filamentous glass reinforcement comprises from about 2.5 to about 60% by weight based on the total weight of the compositions of the present invention. It is more preferred that the glass comprise from about 5 to about 55 and most preferred from about 20 to about 40% by weight of the total weight of the composition.

The present invention may further comprise a flame retardant compound. Any of the conventional halogenated aromatic flame retardants such as decabromodiphenyl ether, brominated phthalimides, brominated polyphenylene ethers, bromine containing polyacrylates or methacrylates, i.e., polypentabromobenzyl acrylate and/or brominated styrene polymers can be employed in the present invention. These are well known to those skilled in the art and are described in the patent literature. Preferred are derivatives of tetrabromo bisphenol A, such as its polycarbonate polymer or the polymer of its adduct with epichlorohydrin (brominated phenoxy resin). They may be used alone, or in conjunction with a synergist, particularly inorganic or organic antimony compounds. Such compounds are widely available or can be made in known ways. Especially preferred is antimony oxide.

Flame retardant embodiments of the present invention may further comprise a drip retardant agent to prevent dripping during burning. Such compounds are well known to those skilled in the art and include, but are not limited to, various fluorinated polyolefins. Particularly useful is polytetrafluoroethylene (PTFE). See, e.g., Wambach, U.S. Pat. No. 3,671,487.

The compositions of the present invention can also comprise a wide variety of other additives, such as UV stabilizers, pigments, colorants, fillers, plasticizers, processing aids, antioxidants and the like. Such components are added in effective amounts to impart the desired properties on the compositions of the present invention for the specific application.

The method of blending the compositions of the present invention is not critical and can be carried out by conventional melt processing techniques. One convenient method comprises blending the PBT resins and other ingredients in powder or granular form, extruding the blend and comminuting into pellets or other suitable shapes. The ingredients are combined in any usual manner, e.g., by dry mixing or by mixing in the melted state in an extruder, on a heated mill or in other mixers.

An alternative method of blending can comprise preparing a preblend of the polyesters and then adding the other ingredients to the preblend. For example, a preblend of the PBT resins and stabilizer can be fed into the upstream port of an extruder with addition of the other ingredients such as glass fibers in a downstream port of the extruder.

In another embodiment, the various compounds can be precompounded, pelletized and then molded. Precompounding can be carried out in conventional equipment. For example, a dry blend of the ingredients can be fed into a single screw extruder, the screw having a long transition section to insure proper melting. Alternatively, a twin screw extrusion machine can be fed with the resins and other additives at the feed port and reinforcements fed downstream. In either case, a generally suitable machine temperature will be from about 450° to about 575° F.

The precompounded composition can be extruded and cut or chopped into molding compounds, such as conventional granules, pellets, etc. by standard techniques.

The compositions can be molded in any equipment conventionally used for thermoplastic compositions. For example, good results will be obtained in an injection molding machine, with conventional cylinder temperatures, e.g., 500° F., and conventional mold temperatures, e.g., 150° F.

DESCRIPTION OF THE PREFERRED EMBODIMENTS

The following examples are presented in order to illustrate the present invention. They are not to be construed to limit the scope of the appended claims in any manner whatsoever.

EXAMPLES 1–3

The following examples demonstrate the use of various stabilizers in a polyester resin blend. The blends are prepared by tumble blending the ingredients (parts by weight), extruding in a 2.5 inch vented single screw extruder with a melt temperature of 500 to 530° F. They are dried and molded on an 80 ton Van Dorn injection molding machine at a temperature of 500° C., and a mold temperature of 150° C. Kayness® melt viscosity is measured by predrying the sample for 1 hour in a circulating oven at 150° C. and using a Kayness, Galaxy V capillary rheometer with a melt temperature of 250° C., melt force of 150 lbs, and a shear rate of 400 sec$^{-1}$. Parallel plate rheology is measured using a Gottfert® 2001 rheometer with a parallel plate radius of 12.5 mm, a gap of 1.0 mm and a melt temperature of 250° C. with a 15% strain. The results along with compositional data are set forth below in Table 1.

TABLE 1

| Example | 1A* | 1 | 2 | 3 |
|---|---|---|---|---|
| Composition, pbw | | | | |
| PBT 295[a] | 40 | 40 | 40 | 40 |
| PBT 195[b] | 15 | 15 | 15 | 15 |
| Glass fibers[c] | 30 | 30 | 30 | 30 |
| FRC[d] | 13.2 | 13.2 | 13.2 | 13.2 |
| PTFE[e] | 1.25 | 1.25 | 1.25 | 1.25 |
| Irganox 1076[f] | 0.15 | 0.15 | 0.15 | 0.15 |
| PE-18[g] | 0.2 | 0.2 | 0.2 | 0.2 |
| DPDP[h] | — | 0.2 | — | — |
| ZnP[i] | — | — | 0.2 | — |
| SAPP[j] | — | — | — | 0.2 |
| Properties | | | | |
| Viscosity, poise[k] | | | | |
| Rheology | | | | |
| 1 minute | 5434 | 4509 | 4201 | 5434 |
| 15 minutes | 7647 | 6649 | 6325 | 6375 |
| % increase | 41 | 47 | 51 | 17 |
| 30 minutes | 14610 | 7423 | 7099 | 12450 |
| % increase | 169 | 64 | 69 | 129 |

*= Comparative Example
[a]= Valox ® 295, General Electric Company, 1100 poise
[b]= Valox ® 195, General Electric Company, 300 poise
[c]= OCF 183E, K filament glass, Owens Corning Fiberglass
[d]= Flame retardant concentrate of brominated polycarbonate, antimony oxide, and a polymer binder
[e]= Polytetrafluoroethylene resin dispersion
[f]= Antioxidant, Ciba-Geigy Company
[g]= Pentaerythritol tetrastearate
[h]= Diphenylisodecyl phosphite, GE Specialty Chemical
[i]= Zinc phosphate, Alfa Chemical Company
[j]= Sodium acid pyrophosphate
[k]= Measured by parallel plate rheology at 250° C.

Figure 2:
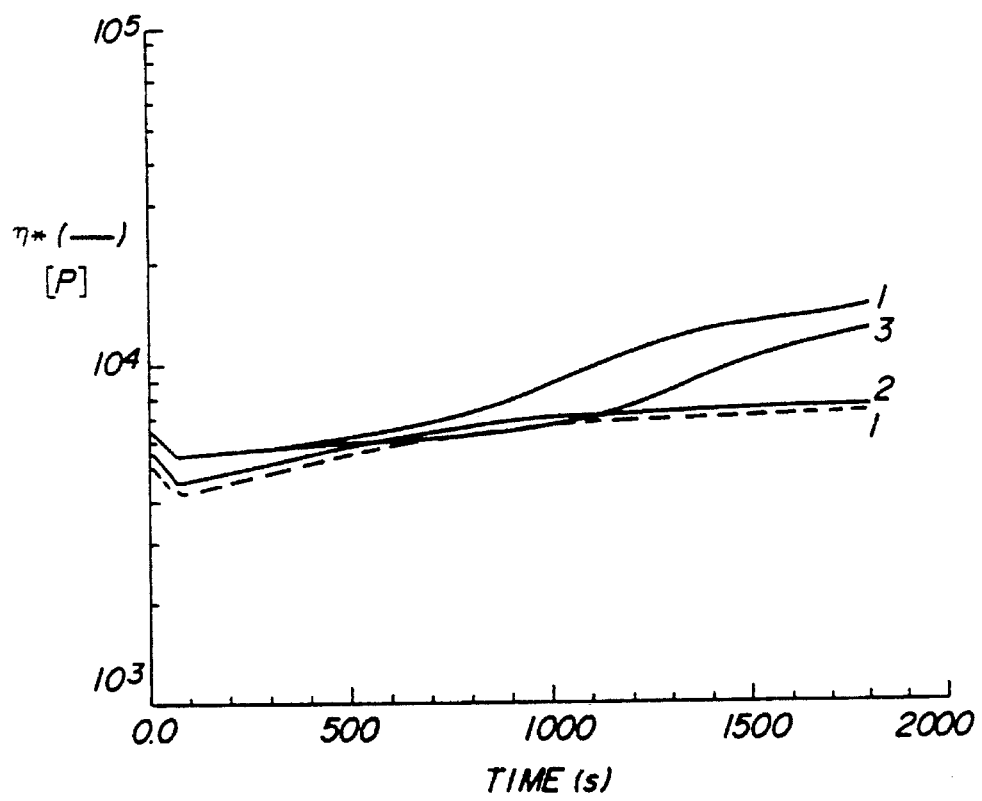
FIG. 2 depicts in graphic form a comparison of time sweeps of blends of high molecular weight PBT and low molecular weight PBT with various additives from the data set forth in Table 1 hereinbelow.

A time sweep of the melt viscosity for the above examples is shown in FIG. 2. It can be seen that the compositions stabilized with DPDP, ZnP and SAPP exhibit significantly improved melt viscosity stability over the control example.

EXAMPLES 4–5

The procedure of Example 1 is generally followed to illustrate the effectiveness of zinc phosphate as a melt stabilizer in polyester blends. The results, along with compositional data are set forth in Table 2 below.

TABLE 2

| Example | 4A* | 4 | 5A* | 5 |
|---|---|---|---|---|
| Composition, pbw | | | | |
| PBT 195[a] | 50 | 49.8 | 50 | 49.8 |
| PBT 295[b] | 50 | 49.8 | — | — |
| PBT 315[c] | — | — | 50 | 49.8 |
| ZnP[d] | — | 0.4 | — | 0.4 |
| Properties | | | | |
| Viscosity, poise Kayeness[e] | | | | |
| T5[f] | 547 | 577 | 1518 | 1662 |
| T10[g] | 528 | 544 | 1303 | 1439 |
| Rheology[h] | | | | |
| 1 minute | 581 | 610 | 1589 | 1868 |
| 15 minute | 756 | 676 | 1554 | 1530 |
| % increase | 30 | 10.8 | −2 | −18 |
| 30 minute | 1109 | 874 | 1891 | 1634 |
| % increase | 91 | 43 | 19 | −12.5 |

\*= Comparative example
[a]= Valox ® 195, General Electric Company, 300 poise
[b]= Valox ® 295, General Electric Company, 1100 poise
[c]= Valox ® 315, General Electric Company, 8500 poise
[d]= Zinc phosphate, $Zn_3(PO_4)_2 \cdot 2H_2O$, Alpha Chem. Co.
[e]= at 250° C., poise
[f]= dwell time, 5 minutes
[g]= dwell time, 10 minutes
[h]= Parallel plate rheology, viscosity vs. time at 250° C. poise, % viscosity increase from 1 minute It can be seen from the data in Table 2 that zinc phosphate prevents build up of melt viscosity in the polyester blends, exhibiting a significant improvement in maintaining a consistent melt viscosity over time.

EXAMPLE 6

The procedure of Example 1 is followed to compare the effectiveness of zinc phosphate stabilizer over other stabilizers. The results, along with compositional data are set forth below in Table 3.

TABLE 3

| Example | 6A* | 6B* | 6C* | 6 |
|---|---|---|---|---|
| Composition, pbw | | | | |
| PBT 295[a] | 40.2 | 40.2 | 40.2 | 40.2 |
| PBT 195[b] | 15.0 | 15.0 | 15.0 | 15.0 |
| Glass Fibers[c] | 30.0 | 30.0 | 30.0 | 30.0 |
| FRC[d] | 13.2 | 13.2 | 13.2 | 13.2 |
| PTFE[e] | 1.25 | 1.25 | 1.25 | 1.25 |
| Irganox 1076[f] | 0.15 | 0.15 | 0.15 | 0.15 |
| PE-18[g] | 0.20 | 0.20 | 0.20 | 0.20 |
| Irgafos 168[h] | — | 0.20 | — | — |
| TPPP[i] | — | — | 0.20 | — |
| ZnP[j] | — | — | — | 0.20 |
| Properties | | | | |
| Viscosity, poise Kayeness[k] | | | | |
| T5[l] | 2995 | 3290 | 3380 | 2200 |
| T10[m] | 3311 | 4144 | 3411 | 2149 |
| Rheology[n], poise | | | | |
| 1 min | 5183 | 4636 | 4414 | 4044 |
| 15 min | 10910 | 7112 | 7718 | 5165 |
| %[o] | 110 | 53.4 | 75 | 28 |
| 30 min | 11840 | 9853 | 8445 | 5644 |
| %[o] | 128 | 112 | 91 | 40 |

\* = Comparative Example
[a]= Valox ® 295, General Electric Company, 1100 poise
[b]= Valox ® 195, General Electric Company, 300 poise
[c]= OCF 183E, K filament glass, Owens Corning Fiberglass
[d]= Flame retardant concentrate, PPG Industries
[e]= Polytetrafluoroethylene concentrate
[f]= Antioxidant, Ciba Geigy Company
[g]= Pentaerythritol tetrastearate
[h]= Tris(2,4-di-t-butylphenyl)phosphite, Ciba Geigy Co.
[i]= Tetrapotassium pyrophosphate
[j]= Zinc phosphate, $Zn_3(PO_4)_2 \cdot 2H_2O$, Alpha Chem. Co.
[k]= at 250° C., poise
[l]= dwell time, 5 minutes
[m]= dwell time, 10 minutes
[n]= Parallel plate rheology, viscosity vs. time at 250° C.
[o]= % viscosity increase from 1 minute Table 3 above clearly demonstrates the improvements in melt viscosity stability obtained with the stabilizers of the present invention. The parallel plate rheology shows a 100% increase in melt viscosity in compositions stabilized with other phosphorus-containing additives, Examples 6A*–6C*, while the composition stabilized according to the present invention exhibits less than 50% increase in melt viscosity. Further, the Kayeness data highlights the viscosity increases for the compositions containing other phosphorus-containing additives.

EXAMPLE 7

The procedure of Example 1 is generally followed to observe the melt viscosity stability of unfilled polyester blends with various stabilizers. The results, along with compositional data are set forth below in Table 4.

TABLE 4

| Example | 7A* | 7B* | 7 |
|---|---|---|---|
| Composition, pbw | | | |
| PBT 295[a] | 50.0 | 49.8 | 49.8 |
| PBT 195[b] | 50.0 | 49.8 | 49.8 |
| Irgafos ® 168[c] | — | 0.4 | — |
| ZnP[d] | — | — | 0.4 |
| Properties | | | |
| Viscosity, poise Kayeness[e] | | | |
| T5[f] | 539 | 544 | 577 |
| T10[g] | 513 | 508 | 544 |
| Rheology[h] | | | |
| 1 min | 607 | 590 | 610 |
| 15 min | 828 | 812 | 676 |
| %[i] | 36 | 38 | 11 |
| 30 min | 1197 | 1114 | 874 |
| %[i] | 97 | 89 | 43 |

\* = Comparative Example
[a]= Valox ® 295, General Electric Company, 1100 poise
[b]= Valox ® 195, General Electric Company, 300 poise
[c]= Tris(2,4-di-t-butylphenyl)phosphite, Ciba Geigy Co.
[d]= Zinc phosphate, $Zn_3(PO_4)_2 \cdot 2H_2O$, Alpha Chem. Co.
[e]= at 250° C., poise
[f]= dwell time, 5 minutes
[g]= dwell time, 10 minutes
[h]= Parallel plate rheology, viscosity vs. time at 250° C.
[i]= % viscosity increase from 1 minute The data in Table 4 demonstrates the significant improvements obtained according to the present invention in unfilled PBT blends.

EXAMPLES 8–13

The procedure of Example 1 is generally followed, except employing further stabilizers. The results, along with compositional data are set forth below in Table 5.

TABLE 5

| Example | 8A* | 8 | 9 | 10 | 11 | 12 | 13 |
|---|---|---|---|---|---|---|---|
| Composition, pbw | | | | | | | |
| Blend[a] | 100 | 99.7 | 99.4 | 99.7 | 99.4 | 99.7 | 99.4 |
| ZnP[b] | — | 0.3 | 0.6 | — | — | — | — |
| SAPP[c] | — | — | — | 0.3 | 0.6 | — | — |
| SDP[d] | — | — | — | — | — | 0.3 | 0.6 |
| Properties | | | | | | | |
| Viscosity, poise Kayeness[e] | | | | | | | |
| T5[f] | 2968 | 2267 | 2250 | 2536 | 2631 | 2566 | — |
| T10[g] | 3374 | 2276 | 2204 | 2686 | 2691 | 2754 | 2724 |
| Rheology[h] | | | | | | | |
| 1 min. | 5320 | 3713 | 3725 | 4452 | 3994 | 4421 | 3991 |
| 15 min. | 9366 | 5281 | 4969 | 5488 | 4828 | 4793 | 4731 |
| %[i] | 76 | 42 | 33 | 23 | 21 | 8.4 | 19 |
| 30 min. | 12210 | 5901 | 5664 | 8106 | 6265 | 7809 | 5816 |
| %[i] | 130 | 59 | 52 | 82 | 57 | 76 | 46 |

*=Comparative Example
[a]= PBT 295 (40.2), PBT 195 (15), glass fiber (30), FRC (13.2), PTFE dispersion (1.25), Irganox ® 1076 (0.15), PE-18 (0.2)
[b]= Zinc phosphate, $Zn_3(PO_4)_2 \cdot 2H_2O$, Alpha Chemical Co.
[c]= Sodium acid pyrophosphate
[d]= Monosodium phosphate
[e]= at 250° C., poise
[f]= dwell time, 5 minutes
[g]= dwell time, 10 minutes
[h]= Parallel plate rheology, viscosity vs. time at 250° C.
[i]= % viscosity increase from 1 minute The data in Table 5 show the improvements in melt viscosity stability provided by compositions of the present invention.

EXAMPLES 14–19

The procedure of Example 1 is generally followed, except employing blends of the low molecular weight PBT with polycarbonate in a non-flame retardant system. The results, along with compositional data are set forth below in Table 6.

TABLE 6

| Example | 14A* | 14 | 15 | 16 | 17 | 18 | 19 |
|---|---|---|---|---|---|---|---|
| Composition | | | | | | | |
| PBT 295[a] | 33.45 | 33.25 | 33.15 | 33.25 | 33.15 | 33.25 | 33.15 |
| PBT 195[b] | 15.0 | 15.0 | 15.0 | 15.0 | 15.0 | 15.0 | 15.0 |
| PC[c] | 20.0 | 20.0 | 20.0 | 20.0 | 20.0 | 20.0 | 20.0 |
| SAC[d] | 1.55 | 1.55 | 1.55 | 1.55 | 1.55 | 1.55 | 1.55 |
| ZnP[e] | — | 0.2 | 0.4 | — | — | — | — |
| SAPP[f] | — | — | — | 0.2 | 0.4 | — | — |
| DPDP[g] | — | — | — | — | — | 0.2 | 0.4 |
| Properties | | | | | | | |
| Viscosity Kayeness[h] | | | | | | | |
| T5[i] | 4670 | 3867 | 3482 | 3287 | 3326 | 3375 | 3457 |
| T10[j] | 6252 | 5072 | 4190 | 3277 | 3298 | 3311 | 3413 |
| % | 34 | 31 | 27 | −0.3 | −0.8 | −1.9 | −1.3 |

*= Comparative Example
[a]= Valox ® 295, General Electric Company, 1100 poise
[b]= Valox ® 195, General Electric Company, 300 poise TABLE 6-continued

| Example | 14A* | 14 | 15 | 16 | 17 | 18 | 19 |
|---------|------|----|----|----|----|----|----|

$^c$= Poly(bisphenol A) carbonate, General Electric Company
$^d$= Mold release/antioxidant stabilizer concentrate
$^e$= Zinc phosphate, $Zn_3(PO_4)_2 \cdot 2H_2O$, Alpha Chem. Co.
$^f$= Sodium acid pyrophosphate
$^g$= diphenylisodecyl phosphite, GE Specialty Chemical
$^h$= at 250° C., poise
$^i$= dwell time, 5 minutes
$^j$= dwell time, 10 minutes The above-mentioned patents and test methods are all hereby incorporated by reference.

Many variations of the present invention will suggest themselves to those of ordinary skill in the art in light of the above-detailed description. Conventional additives such as clay, mica, pigments and colorants can be added in conventional amounts. Other phosphite stabilizers such as diisooctyl phosphite, trilauryl phosphite, diphenyl phosphite, phenyl diisodecyl phosphite, ethyl hexyl diphenylphosphite and stearyl phosphite may be employed. Further, the compositions can include a wide variety of other thermoplastic resins such as polycarbonates, polyarylates, polyester carbonates and mixtures thereof; as well as a variety of impact modifiers such as core-shell polymers, ethylene vinyl acetate, ethylene ethylacrylate copolymer, SEBS, SBS, EPDM and EPR. All such obvious variations are within the full intended scope of the appended claims.

I claim:

1. A thermoplastic resin blend comprising:
   (a) a relatively low molecular weight polybutylene terephthalate resin having a melt viscosity of less than 600 poise;
   (b) a relatively high molecular weight polyester resin having a melt viscosity greater than 600 poise; and
   (c) an effective melt viscosity stabilizing amount of (i) an acid, alkyl, aryl or mixed phosphite having at least one acidic hydrogen or alkyl group, (ii) a phosphorus oxo acid or (iii) a mixture of any of the foregoing.

2. A thermoplastic resin blend as defined in claim 1 wherein said component (a) has a melt viscosity of less than about 450 poise.

3. A thermoplastic resin blend as defined in claim 1 wherein said component (b) has a melt viscosity of greater than about 900 poise.

4. A thermoplastic resin blend as defined in claim 1 wherein said component (a) comprises a poly(1,4-butylene terephthalate) resin.

5. A thermoplastic resin blend as defined in claim 1 wherein said component (b) comprises a poly(1,4-butylene terephthalate) resin.

6. A thermoplastic resin blend as defined in claim 1 wherein said component (b) comprises polyethylene terephthalate, polycyclohexane dimethylene terephthalate or a mixture thereof.

7. A thermoplastic resin blend as defined in claim 1 wherein said phosphite component (c)(i) comprises a phosphite of the general formula $$P-(OR')_3$$

wherein each R' is the same or different and independently represents hydrogen, alkyl, aryl or a mixture of alkyl and aryl provided that at least one R' group is hydrogen or alkyl.

8. A thermoplastic resin blend as defined in claim 7 wherein said phosphite component (c)(i) is selected from the group of diisooctyl phosphite, trilauryl phosphite, diphenyl phosphite, phenyl diisodecyl phosphite, ethyl hexyl diphenyl phosphite, stearyl phosphite and mixtures of any of the foregoing.

9. A thermoplastic resin blend as defined in claim 8 wherein said phosphite component (c)(i) comprises diphenylisodecyl phosphite.

10. A thermoplastic resin blend as defined in claim 1 wherein said phosphorus oxo acid (c) (ii) comprises phosphorous acid, phosphoric acid, polyphosphoric acid, hypophosphorous acid or mixtures thereof.

11. A thermoplastic resin blend as defined in claim 1 comprising from about 30 to about 70 parts by weight component (a), from about 70 to about 30 parts by weight component (b), and from about 0.1 to about 10 parts by weight component (c) based on 100 total parts by weight of components (a), (b) and (c).

12. A thermoplastic resin blend as defined in claim 1 further comprising (d) a thermoplastic resin selected from polycarbonates, polyester carbonates, polyarylates and mixtures of any of the foregoing.

13. A thermoplastic resin blend as defined in claim 12 wherein said component (d) comprises a poly(bisphenol A)carbonate.

14. A thermoplastic resin blend as defined in claim 1 further comprising (e) a reinforcing agent comprising glass fibers, talc, mica, clay or mixtures thereof.

15. A thermoplastic resin blend as defined in claim 1 further comprising (f) a flame retardant agent.

16. A thermoplastic resin blend as defined in claim 1 further comprising (g) an additive selected from impact modifiers, pigments, fillers, plasticizers, processing aids, UV stabilizers, antioxidants and mixtures of any of the foregoing.

17. An article prepared from a composition as defined in claim 1.

18. A process for stabilizing the melt viscosity of a thermoplastic resin blend comprising a relatively low molecular weight polybutylene terephthalate resin having a melt viscosity of less than 600 poise; and a relatively high molecular weight polyester having a melt viscosity greater than 600 poise, said process comprising adding to said blend an effective amount of a phosphorus compound comprising (i) an acid, alkyl, aryl or mixed phosphite having at least one acidic hydrogen or alkyl group, (ii) a phosphorus oxo acid or (iii) a mixture of any of the foregoing.

19. A process as defined in claim 18 wherein said relatively low molecular weight PBT resin has a melt viscosity of less than about 450 poise and said relatively high molecular weight polyester resin has a melt viscosity of greater than about 900 poise.

20. A process as defined in claim 19 wherein said high molecular weight polyester resin comprises polybutylene terephthalate, polyethylene terephthalate, polycyclohexane dimethylene terepthalate, or a mixture of any of the foregoing.

21. A process as defined in claim 18 wherein said phosphorus compound is diphenylisodecyl phosphate.

22. A thermoplastic resin blend having improved melt viscosity stability consisting essentially of
- (a) a low molecular weight polybutylene terephthalate resin having a melt viscosity of less than 600 poise;
- (b) a high molecular weight polyester resin having a melt viscosity greater than 600 poise; and
- (c) an effective melt viscosity stabilizing amount of (i) an acid, alkyl, aryl or mixed phosphite having at least one acidic hydrogen or alkyl group, (ii) a phosphorus oxo acid or (iii) a mixture of any of the foregoing; and, optionally, one or more of the following components:
- (d) a thermoplastic resin selected from polycarbonates, polyester carbonates, polyarylates and mixtures of any of the foregoing;
- (e) a reinforcing agent;
- (f) a flame retardant agent; and
- (g) an additive selected from impact modifiers, pigments, fillers, colorants, plasticizers, processing aids, UV stabilizers, antioxidants and mixtures of any of the foregoing.

* * * * *